(12) United States Patent
Park et al.

(10) Patent No.: US 7,692,737 B2
(45) Date of Patent: Apr. 6, 2010

(54) LIQUID CRYSTAL DISPLAY DEVICE

(75) Inventors: Chi Hyuck Park, Daegu (KR); Tae Bong Jung, Seoul (KR)

(73) Assignee: LG Display Co., Ltd., Seoul (KR)

( * ) Notice: Subject to any disclaimer, the term of this patent is extended or adjusted under 35 U.S.C. 154(b) by 236 days.

(21) Appl. No.: 11/404,834

(22) Filed: Apr. 17, 2006

(65) Prior Publication Data

US 2006/0238680 A1  Oct. 26, 2006

(30) Foreign Application Priority Data

Apr. 22, 2005  (KR) .................. 10-2005-0033709

(51) Int. Cl.
*G02F 1/1335* (2006.01)
(52) U.S. Cl. ......................... 349/96; 349/117
(58) Field of Classification Search ............. 349/96–98, 349/117–119
See application file for complete search history.

(56) References Cited

U.S. PATENT DOCUMENTS 5,793,455 A * 8/1998 Nakamura .................. 349/96
6,542,300 B2 * 4/2003 Umemoto .................. 359/491
6,559,834 B1 5/2003 Murakami et al.
6,667,787 B2 * 12/2003 Umemoto .................. 349/96
6,791,656 B2 * 9/2004 Kouya ........................ 349/158

FOREIGN PATENT DOCUMENTS

| JP | 10133018 A | 5/1998 |
|---|---|---|
| JP | 2001318223 A | 11/2001 |
| JP | 2002055341 A | 2/2002 |
| JP | 2004094219 A | 3/2004 |
| JP | 2005091900 A | 4/2005 |

* cited by examiner

Primary Examiner—Dung T. Nguyen
(74) Attorney, Agent, or Firm—Holland & Knight LLP

(57) ABSTRACT

A liquid crystal display device includes a liquid crystal display panel, a compensation film for compensating a viewing angle decline caused by improper alignment of liquid crystal molecules in the liquid crystal display panel, and an isotropic layer between the compensation film and the liquid crystal display panel.

6 Claims, 9 Drawing Sheets

FIG. 4
RELATED ART
OPTICAL AXIS — DIRECTION OF THE OPTICAL AXIS IS NOT CHANGED
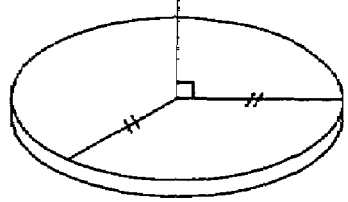 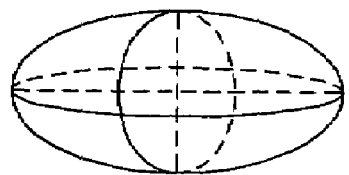
LIQUID CRYSTAL CONDITION WITHIN A COMPENSATION FILM BEFORE A HEAT CONTRACTION
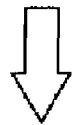
OPTICAL AXIS
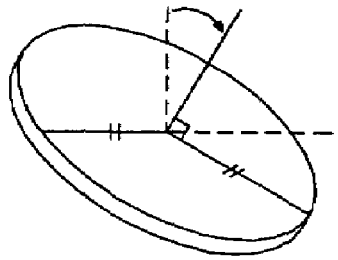 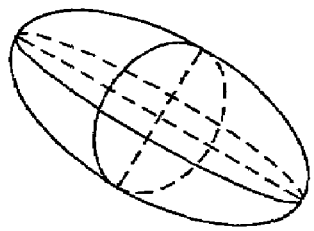
LIQUID CRYSTAL CONDITION WITHIN THE COMPENSATION FILM AFTER A HEAT CONTRACTION

LIQUID CRYSTAL DISPLAY DEVICE

This application claims the benefit of Korean Patent Application No. P2005-0033709 filed in Korea on Apr. 22, 2005, which is hereby incorporated by reference.

BACKGROUND OF THE INVENTION

1. Field of the Invention

The present invention relates to a display device, and more particularly to a liquid crystal display device.

2. Description of the Related Art

Generally, a liquid crystal display device includes a liquid crystal module (hereinafter, "LCM"), a driving circuit for driving the LCM and a case. The LCM includes a liquid crystal display panel having liquid crystal cells arranged in a matrix between two substrates, a backlight unit for irradiating light to the liquid crystal display panel. The LCM also includes an optical sheet for directing light from the backlight unit into a vertical direction toward the liquid crystal display panel, a lower polarizing plate at a lower portion of the liquid crystal display panel for polarizing light emitted from the backlight unit in a first direction and an upper polarizing plate at an upper portion of the liquid crystal display panel for polarizing light emitted from the liquid crystal display panel in a second direction perpendicular to the first direction. Such a liquid crystal display panel, a backlight unit and an optical sheet work together to prevent a light loss. The case encloses and protects the outside of the LCM to prevent damage to the LCM by an outside force.

FIG. 1 is a cross-sectional view of the related art liquid crystal module. Referring to FIG. 1, a liquid crystal module 1 includes a liquid crystal display panel 2 having a liquid crystal cell matrix, an upper polarizing plate 42 is positioned at a front surface of the LCM and a lower polarizing plate 40 is positioned at a rear surface of the liquid crystal display panel 2. A backlight unit 3 is positioned under the lower portion of the lower polarizing plate 40.

The liquid crystal display panel 2 includes a thin film transistor array substrate 2a and a color filter array substrate 2b adhered to each other with a liquid crystal layer (not shown) between the two substrates. The thin film transistor array substrate 2a includes signal lines (not shown) and thin film transistors (not shown). The color filter array substrate 2b includes color filters (not shown) and a black matrix (not shown).

The backlight unit 3 includes a lamp 20 for generating light, a lamp housing 10 for enclosing the lamp 20, a light guide plate 24 for distributing light from the lamp 20 across the liquid crystal display panel 2, a reflector 26 at the rear surface of the light guide plate 24, and diff-using sheets 30 sequentially built on the light guide plate 24. The lower polarizing plate 40 is attached to the rear surface of the thin film transistor array substrate 2a so that the liquid crystal display panel 2 can receive polarized light from the backlight unit 3, and the upper polarizing plate 42 is attached to the front surface of the color filter array substrate 2b to emit polarized light from the liquid crystal display panel 2.

FIG. 2 is a diagram for explaining a structure of the related art polarizing plate and the viewing angle compensation principle by the compensation film of the polarizing plate. FIG. 2 is a diagram of the related art polarizing plates 40 and 42 coupled with a liquid crystal display panel. As shown in FIG. 2, the related art polarizing plates 40 and 42 have a structure in which the compensation film (d-LC: discotic-LIQUID CRYSTAL) 40b and 42b, a first protective layer (wide view tree acetate cellulose: Wv-TAC) 40c and 42c, a polarizer (Poly Vinyl Alcohol: PVA) 40d and 42d and a second protective layer 40e and 42e are sequentially built on each of the upper and lower substrates 2a and 2b of the liquid crystal display panel. The compensation films 40b and 42b are attached to the outer surfaces of the substrates 2a and 2b of the liquid crystal display panel by adhesive 40a and 42a.

The compensation film 42b compensates for a viewing angle decline by orienting liquid crystal molecules 50 in the compensation film 42b to be symmetrical with respect to liquid crystal molecules 51 at an area A of an upper portion of the liquid crystal layer adjacent to an alignment film 53 in the liquid crystal display panel. As shown in FIG. 2, whenever an electric field is applied to liquid crystal molecules 51 (that is, a TN mode), a misalignment is generated in the liquid crystal molecules 51 at an area A of the liquid crystal display panel by an alignment force of the alignment film 53 inside of the upper substrate 2b. The decline of the viewing angle by such an improper liquid crystal alignment in the area A is prevented by the compensation film 42b including liquid crystal layer molecules 50 aligned in such a manner as to have symmetry with the liquid crystal molecules 51 in the misaligned liquid crystal area A. Compensation film 40b also including liquid crystal layer molecules aligned in such a manner as to have symmetry with the liquid crystal molecules that are improperly aligned adjacent to the alignment film 54 inside of the upper substrate 2a.

First protective layers 40c and 42c and second protective layers 40e and 42e are respectively positioned at the upper/lower surfaces of the polarizers 40d and 42d to protect the polarizers 40d and 42d. The first protective layers 40c and 42c also assists in the functions of the compensation films 40b and 42b in the role of viewing angle compensation. The polarizers 40d and 42d are a Poly Vinyl Alcohol film coated with iodine and stretched in a specific direction. The light is absorbed in the stretched direction and penetrates in the direction that is perpendicular to the stretched direction so as to polarize the light.

FIG. 3 is a diagram representing a transformation of each layer by a shear stress generated between a static upper substrate and a contracting force of a polarizer. After the polarizer 42d is stretched in a designated direction, it is then affixed in the stretched state by the first and second protective layers 42c and 42e so as to have a light polarization capability. But such a polarizer 42d has a tendency to contract in a direction opposite to that of the stretched direction when subjected to either or both internal heat from the backlight unit and external heat. As a result, the first protective layer 42c and the compensation film 42b also contract in a direction opposite to the stretched direction due the contracting polarizer 42d, as shown in FIG. 3. Because a lower area of the compensation film 42b is firmly attached by an adhesive layer 142a to the upper substrate 2b while an upper area of the compensation film 142b is affected by a contracting force transmitted through the first protective layer 142c from the polarizer 142c, a strong shear stress is generated at the lower area of the compensation film 142b. Due to the shear stress, a refraction index anisotropy is generated in the liquid crystals within the compensation film 142b.

FIG. 4 is a diagram representing a change in optical axial direction of the liquid crystal molecules within a compensation film by shear stress on the compensation film. FIG. 5 shows a related art liquid crystal module exhibiting a light leakage phenomenon due to a contracted polarization film. As shown in FIG. 4, the liquid crystal molecule has a steady state optical axial direction before a heat contraction. However, the optical axial direction of the liquid crystal molecule diverges from the steady state position due shear stress caused by a contraction at the upper portion of the compensation film 42b, so that an optical axial direction of the liquid crystal is changed. Thus, the initial alignment of the liquid crystal molecules 51 positioned within the compensation film 42b is disturbed and thus can no longer sufficiently compensate for the improperly aligned liquid crystal molecules of the liquid crystal display panel. As a result, light leakage is generated while realizing an image so as to cause a reduction in picture quality, as shown in FIG. 5.

SUMMARY OF THE INVENTION

Accordingly, the present invention is directed to a liquid crystal display device that substantially obviates one or more of the problems due to limitations and disadvantages of the related art.

An object of the present invention to provide a liquid crystal display device having a uniform brightness.

An object of the present invention to provide a fabricating method of a liquid crystal display device having a uniform brightness.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a liquid crystal display panel, a compensation film for compensating a viewing angle decline caused by improper alignment of liquid crystal molecules in the liquid crystal display panel, and an isotropic layer between the compensation film and the liquid crystal display panel.

In another aspect, a liquid crystal display device includes a liquid crystal display panel, a polarizer for polarizing light, a compensation film positioned between the polarizer and the liquid crystal display panel, and an isotropic layer between the compensation film and the liquid crystal display panel.

In yet another aspect, a liquid crystal display device includes a liquid crystal display panel, a first compensation film at an upper side of the liquid crystal display panel, a second compensation film at a lower side of the liquid crystal display panel, a first isotropic layer between the first compensation film and the liquid crystal display panel, and a second isotropic layer between the second compensation film and the liquid crystal display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a diagram representing a change in optical axial direction of the liquid crystal molecule within a compensation film by shear stress on the compensation film;

DETAILED DESCRIPTION OF THE PREFERRED EMBODIMENTS

Reference will now be made in detail to the preferred embodiments of the present invention, examples of which are illustrated in the accompanying drawings of FIGS. 6 to 9.

Figure 1:
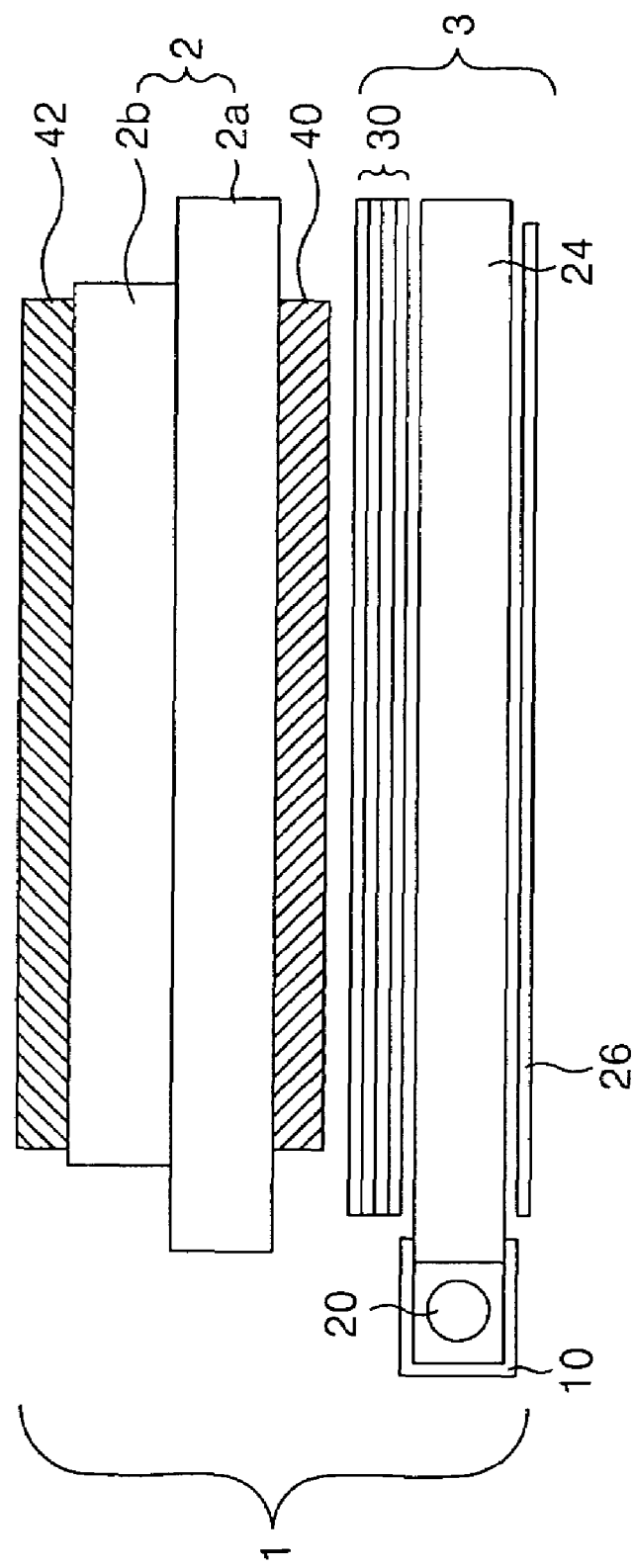
FIG. 1 is a cross-sectional view of the related art liquid crystal module.
Figure 2:
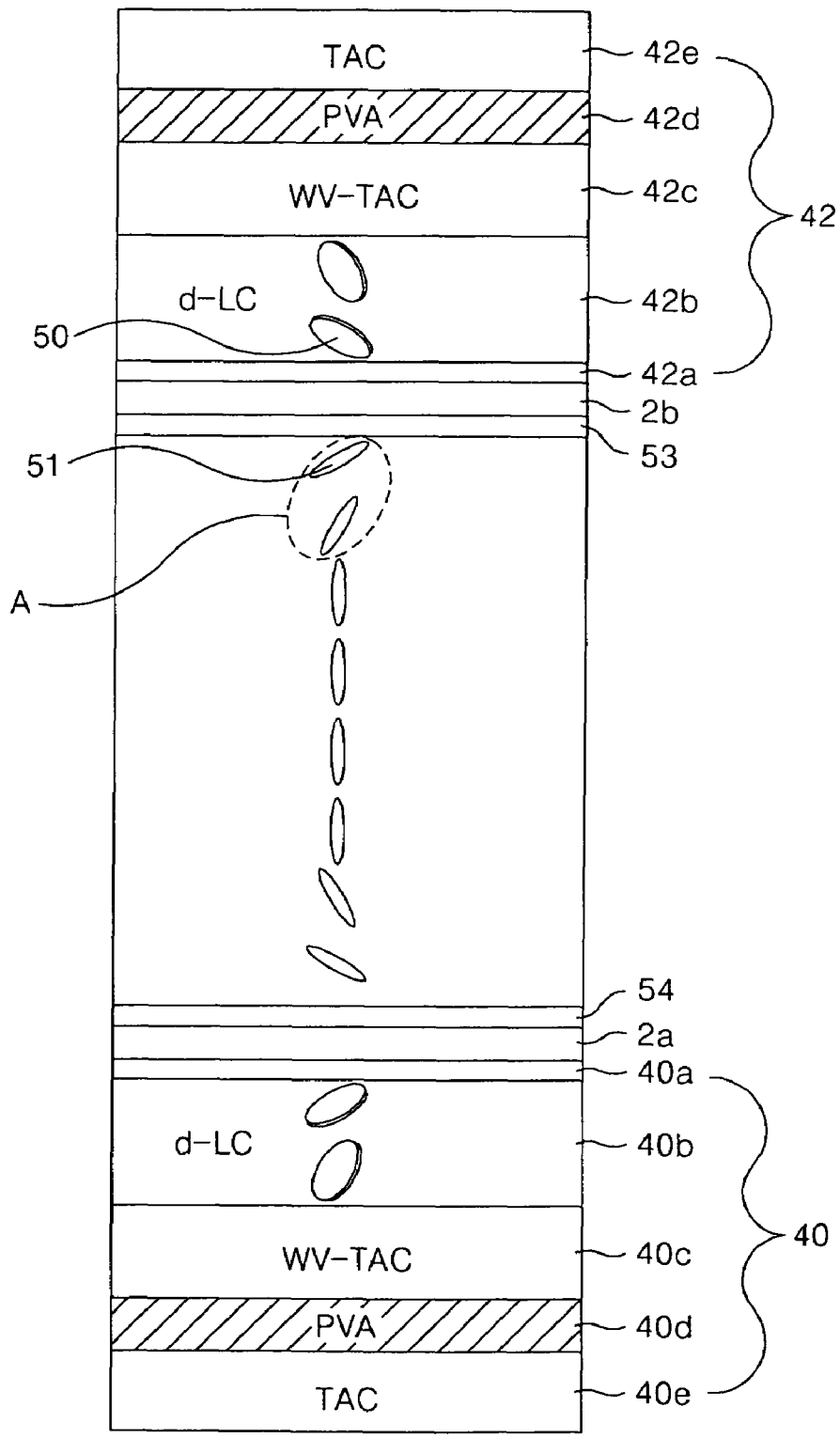
FIG. 2 is a diagram for explaining a structure of the related art polarizing plate and the viewing angle compensation principle by the compensation film of the polarizing plate.
Figure 3:
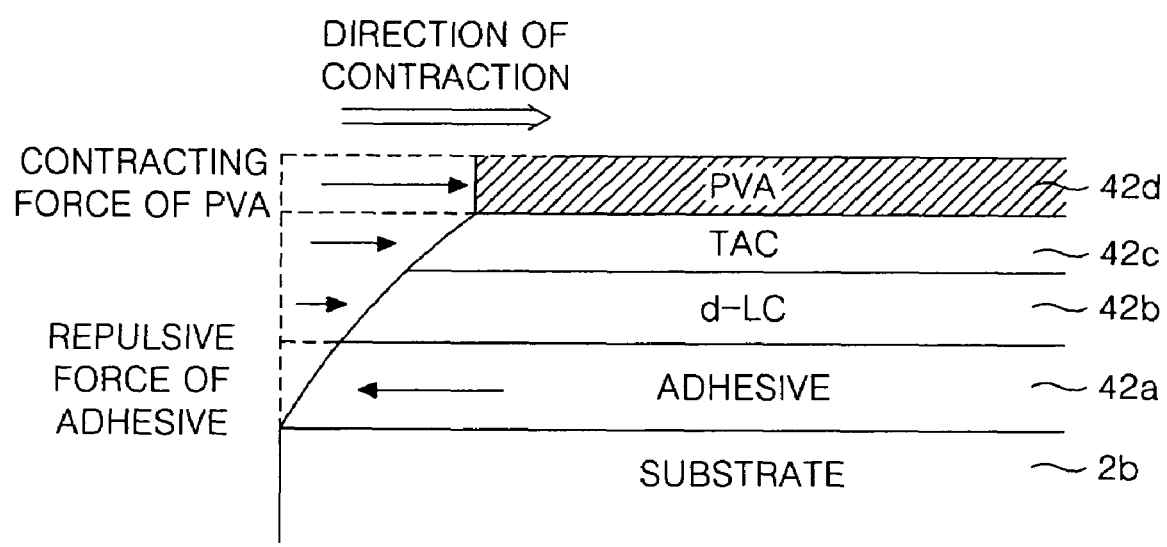
FIG. 3 is a diagram representing a transformation of each layer by a shear stress generated by an adhesion force of an adhesive and a contracting force of a polarizer.
Figure 5:
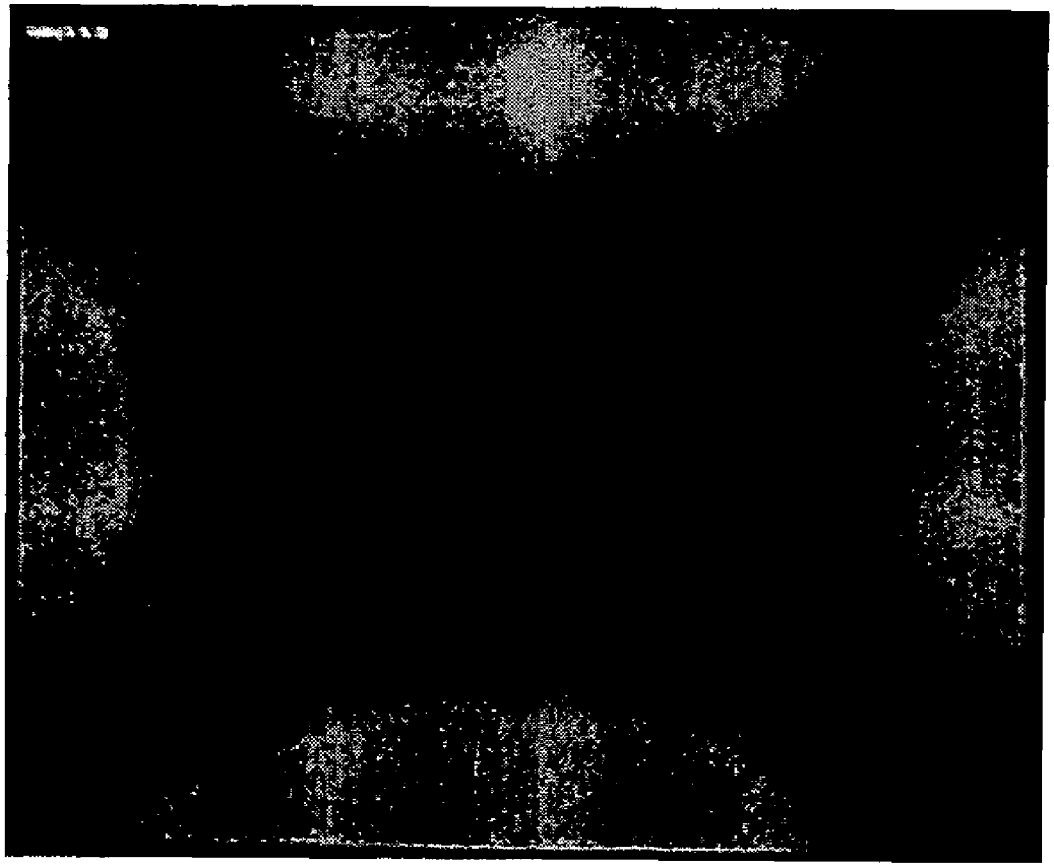
FIG. 5 shows the related art liquid crystal module exhibiting a light leakage phenomenon due to a contracted polarization film.
Figure 6:
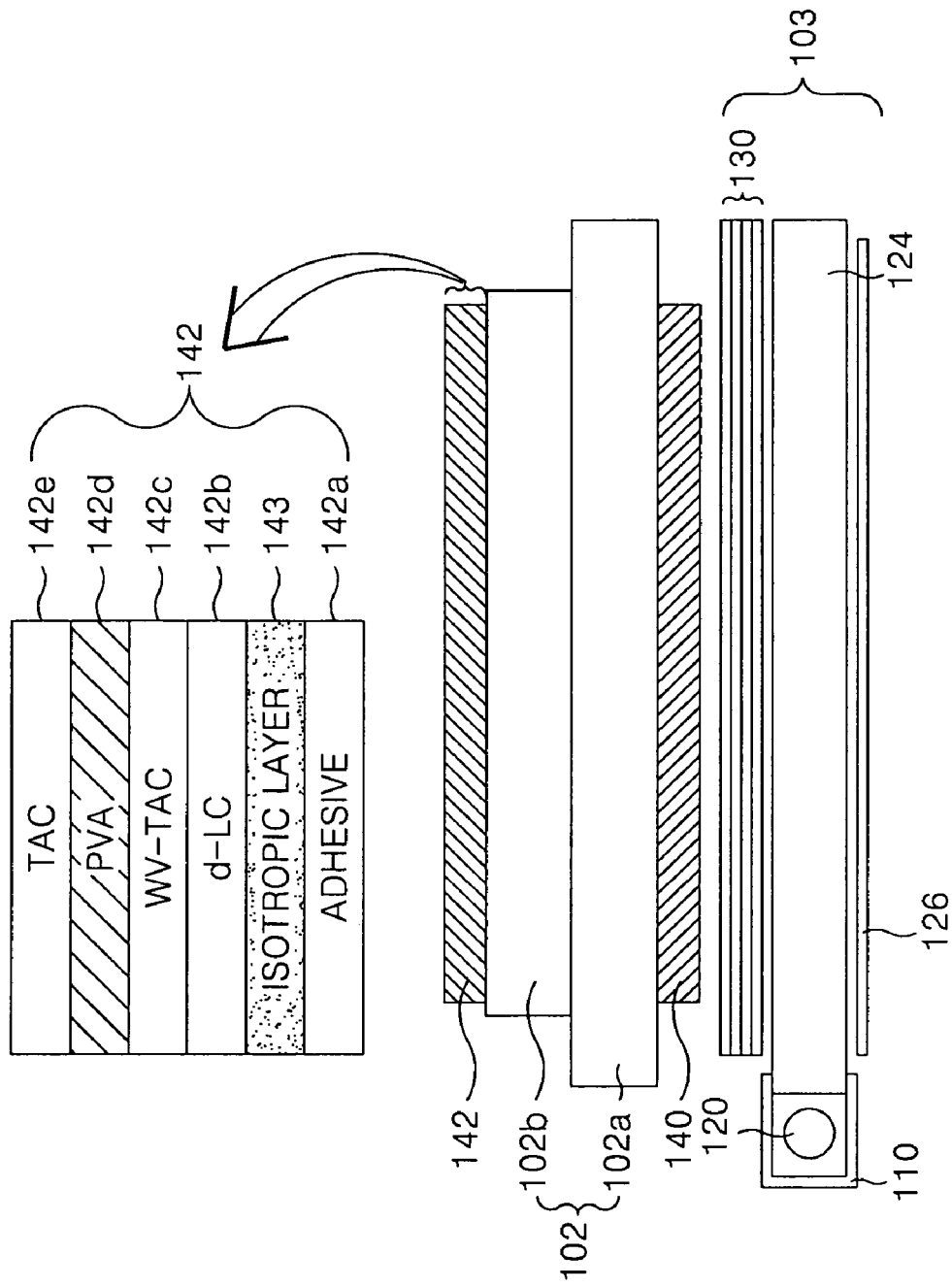
FIG. 6 is a cross-sectional view of a liquid crystal module according to an embodiment of the present invention.

FIG. 6 is a cross-sectional view of a liquid crystal module (LCM) according to an embodiment of the present invention. Referring to FIG. 6, an LCM includes a liquid crystal display panel 102 having a liquid crystal cell matrix, an upper polarizing plate 142 positioned at a front surface of the liquid crystal display panel 102, a lower polarizing plate 140 positioned at a rear surface of the liquid crystal display panel 102, and a backlight unit 103 positioned under a lower portion of the lower polarizing plate 140.

The liquid crystal display panel 102 includes a thin film transistor array substrate 102a and a color filter array substrate 102b adhered to each other with a liquid crystal layer between the substrates. The thin film transistor array substrate 102a includes signal lines, thin film transistors and a lower alignment film. The color filter array substrate 102b includes color filters, a black matrix and an upper alignment film.

The backlight unit includes a lamp 120 for generating light, a lamp housing 110 enclosing the lamp 120, a light guide plate 124 for distributing light from the lamp 120 across the liquid crystal display panel 102, a reflector 126 at the rear surface of the light guide plate 124, and diffusing sheets 130 sequentially built on the light guide plate 124.

The lower polarizing plate 140 is attached to the rear surface of the thin film transistor array substrate 102a so that the liquid crystal display panel 102 receives polarized light from the backlight unit 103 and the upper polarizing plate 142 is attached to the front surface of the color filter array substrate 102b so as to emit polarized light from the liquid crystal display panel 102.

The polarizing plates 140 and 142 have a structure in which an isotropic layer 143, a compensation film (d-LC: discotic-LIQUID CRYSTAL) 142b, a first protective layer (wide view tree acetate cellulose: WV-TAC) 142c, a polarizer (Poly Vinyl Alcohol: PVA) 142d and a second protective layer 142e are sequentially built on the substrate (upper or lower substrate). The compensation film 142b is attached to the substrate of the liquid crystal display panel through the isotropic layer 143 by an adhesive 142a so as to compensate a decline in viewing angle by differentially aligning liquid crystal molecules at an area of the upper portion of the liquid crystal display panel and a lower alignment film.

The first and second protective layers 142c and 142e are positioned on the upper/lower portions of the polarizer 142d to protect the polarizer 142d. Further, the first protective layer 142c assists in the function of the compensation film 142b by playing a role in realizing a wider viewing angle. The polarizer 142d is a Poly Vinyl Alcohol film coated with iodine and stretched in a specific direction. The light is absorbed in the stretched direction of the polarizer 142d and penetrates through the polarizer 142d in a direction perpendicular to the stretched direction so as to polarize the light.

The isotropic layer 143 includes an isotropic medium to absorb a shear stress due to the contracting of the polarizer 142d between an adhesive on the color filter array substrate 102b and the compensation film 142b. Accordingly, divergence in optical axial directions of the liquid crystal molecules within the compensation film 142b is prevented. The isotropic layer 143 can have a cyclo orefin polymer as the isotropic medium, for example.

Figure 7:
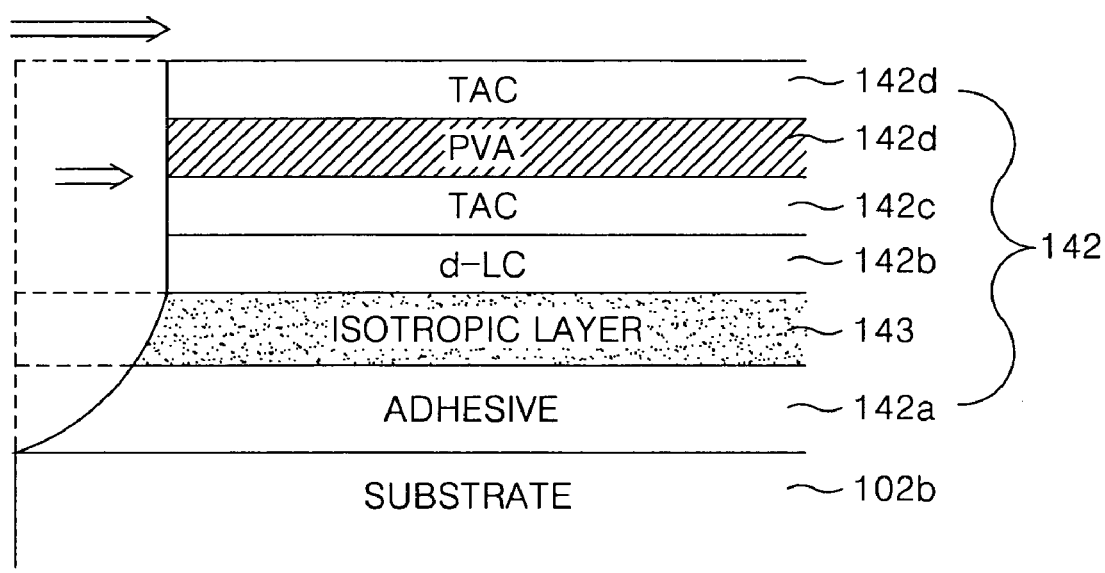
FIG. 7 is a diagram for explaining the shear stress absorbing role of an isotropic layer shown in FIG. 6.
Figure 8:
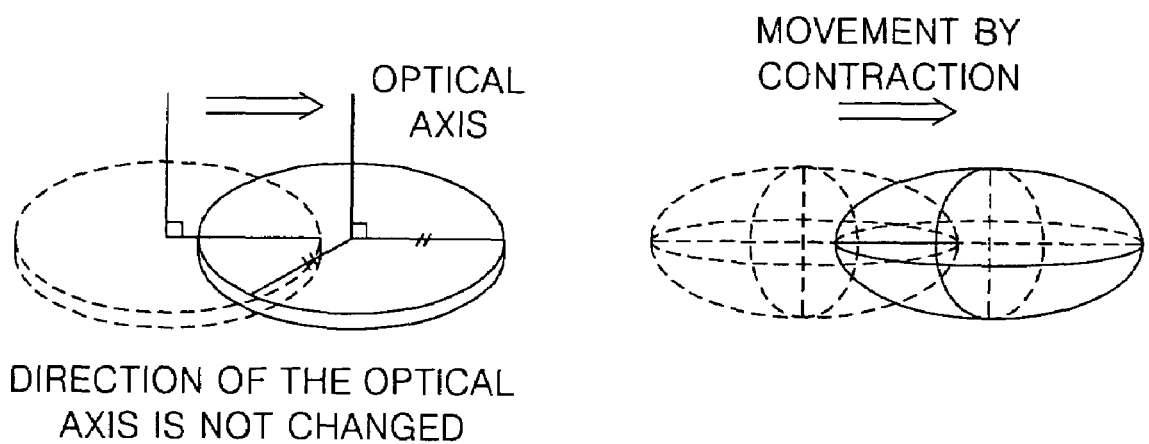
FIG. 8 is a diagram representing a state of a liquid crystal layer of a compensation film before and after a contracting of a polarizer.
Figure 9:
FIG. 9 shows a liquid crystal module according to an embodiment of the present invention having reduced light leakage and improved picture quality.

Hereinafter, absorption of the shear stress will be described in more detail with reference to FIG. 7 to FIG. 9. FIG. 7 is a diagram for explaining the shear stress absorbing role of an isotropic layer shown in FIG. 6. FIG. 8 is a diagram representing a state of a liquid crystal layer of a compensation film before and after a contracting polarizer. FIG. 9 shows a liquid crystal module according to an embodiment of the present invention having reduced light leakage and improved picture quality.

The polarizer 142d is stretched in a designated direction and then is fixed in the stretched state by the first and second protective layers 142c and 142e. However, such a polarizer 142d can contract in a direction opposite to the stretched direction in response to heat or over time due to aging. A strong shear stress can be generated in a lower area of the compensation film 142b since the lower area of the compensation film 142b is attached to a static substrate with an adhesive while an upper area of the compensation film 142b is attached to a contracting polarizer 142 via the protective layer 142c. Such a shear stress can affect the liquid crystal molecules of the compensation film 142b such that the liquid crystal molecules are disturbed to cause a misalignment or change in the optical axial direction of the liquid crystal molecules in the compensation film. To solve this problem, an isotropic layer is positioned between an adhesive on a substrate and a compensation film in embodiments of the present invention.

As shown in FIG. 7, the isotropic layer 143 absorbs the shear stress generated by a contracting polarizer 142d. Accordingly, the amount of shear stress affecting the compensation film 142b is very small, so that a change in the optical axial direction of the liquid crystal molecules within the compensation film 142b does not occur. Although the liquid crystal molecules of the compensation film 142b may be shifted by the contracting polarizer 142d, a refractive index anisotropy is not generated within the liquid crystal layer of the compensation film 142b because the optical axial direction of the liquid crystal molecules is not changed, as shown in FIG. 8. In other words, a contraction of the compensation film 142b is not entirely removed by contracting of the polarizer 142b. But the shear stress is absorbed by the isotropic layer 143 rather than the lower area of the compensation film 142d, the optical axial direction of the liquid crystal molecules in the is the compensation film 142d is not changed. As a result, the liquid crystal molecules within the compensation film 142b corrects a decline in viewing angle by an abnormally aligned liquid crystal molecules within the liquid crystal display panel, so that the light leakage does not occur and the picture quality is considerably improved, as shown in FIG. 9.

As above-mentioned, a liquid crystal module according to embodiments of the present invention includes a polarizer sandwiched by protective layers on a compensation film, which is on an isotropic layer that is attached to a liquid crystal display panel by an adhesive. The isotropic layer absorbs a shear stress generated by a contracting polarizer so as to prevent a change of the optical axial direction in the liquid crystal molecules within the compensation film. As a result of the isotropic layer absorbing the shear stress, the compensation film functions normally to prevent light leakage and maintain picture quality with a uniform brightness.

It will be apparent to those skilled in the art that various modifications and variations can be made in the liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a liquid crystal display panel; and
   upper and lower polarizing plates at front and rear surfaces of the liquid crystal display panel, respectively,
   wherein the upper polarizing plate includes,
      a first polarizer at an upper side of the liquid crystal display panel;
      first upper and lower protective layers at upper and lower surfaces of the first polarizer;
      a first compensation film at a lower side of the first lower protective layer;
      a first isotropic layer between the first compensation film and the liquid crystal display panel; and
      a first adhesive layer between the first isotropic layer and the liquid crystal display panel for bonding the first isotropic layer to the liquid crystal display panel, and
   wherein the lower polarizing plate includes,
      a second polarizer at a lower side of the liquid crystal display panel;
      second upper and lower protective layers at upper and lower surfaces of the second polarizer;
      a second compensation film at an upper side of the second lower protective layer
      a second isotropic layer between the second compensation film and the liquid crystal display panel; and
      a second adhesive layer between the second isotropic layer and the liquid crystal display panel for bonding the second isotropic layer to the liquid crystal display panel,
   wherein the first and second isotropic layers include cyclo orefin polymer for absorbing a shear stress by an adhesion force of the first and second adhesive layers and a contractile force of the first and second polarizers.

2. The liquid crystal module as claimed in claim 1, wherein each of the first and second compensation films contracts along with contraction of each of the first and second polarizing plates.

3. The liquid crystal display device as claimed in claim 1, wherein each of the first and second isotropic layers absorbs a shear stress generated by a contraction of the first and second polarizers.

4. The liquid crystal display device as claimed in claim 1, wherein the isotropic layer prevents a change in optical axial direction of liquid crystal molecules within the compensation film.

5. The liquid crystal display device as claimed in claim 1, wherein each compensation film includes a liquid crystal molecules arranged symmetrically to misaligned liquid crystal molecules within the liquid crystal display panel.

6. The liquid crystal display device as claimed in claim 1, wherein each compensation film compensates for a decline of viewing angle by improperly aligned liquid crystal molecules within the liquid crystal display panel.

* * * * *